United States Patent [19]
Tantlinger

[11] 3,791,691
[45] Feb. 12, 1974

[54] BUS STRUCTURE WITH EXTENSIBLE FRONT PLATFORM

[75] Inventor: Keith W. Tantlinger, Coronado, Calif.

[73] Assignee: Rohr Industries, Inc., Chula Vista, Calif.

[22] Filed: Mar. 15, 1972

[21] Appl. No.: 235,035

[52] U.S. Cl............... 296/28 A, 105/341, 105/427, 105/443, 296/28 A
[51] Int. Cl.......................... B60j 5/02, B62d 31/02
[58] Field of Search .......... 296/146, 28 A; 280/166; 287/88; 104/343, 443, 449, 341

[56] References Cited
UNITED STATES PATENTS

| 3,341,223 | 9/1967 | Wampler | 280/166 |
| 3,588,160 | 6/1971 | Reiner | 105/449 |
| 2,929,655 | 3/1960 | Hurter | 296/28 A |
| 481,467 | 8/1892 | Brownell | 105/343 |

FOREIGN PATENTS OR APPLICATIONS

| 890,709 | 11/1943 | France | 296/28 A |
| 904,692 | 11/1945 | France | 296/28 A |

Primary Examiner—David Schonberg
Assistant Examiner—John A. Pekar

[57] ABSTRACT

A transportation type vehicle herein described as a bus, has a door opening in its front end for loading and discharging passengers, and an extensible front platform, preferably with shock absorber mounting. A door for closing the door opening may be carried by the platform, so that extending the platform opens the door. Each side of the platform preferably comprises a drop ramp, which may be so controlled by the driver that extending the platform automatically lowers the ramp on a selected side of the bus, while at the same time a gate bars exit from the other side. Thus, the entire interior of the vehicle body is available for seating passengers, and passengers may be taken on or discharged from either selected side of the bus, as on a one way street.

6 Claims, 5 Drawing Figures

BUS STRUCTURE WITH EXTENSIBLE FRONT PLATFORM

BACKGROUND OF THE INVENTION

At present it is customary in bus construction to provide a door at one side of the front of the bus with a stairwell leading down from floor level to the door, the bottom step being at substantially curb height. The stairwell is located within the passenger compartment of the bus, and occupies valuable space which could be used for additional seating if it could be eliminated.

In most states and in interstate travel in the United States at least, bus length is limited by law, a usual limit being 40 feet. Seat/mile costs are now at an all time high, due in part at least to high driver wages, so it is desirable to carry as many passengers as possible per trip. Elimination of the stairwell would add about twenty square feet per bus for usable seating, and the use of ramps instead of steps would facilitate boarding and leaving the bus by infirm people and those in wheel-chairs.

OBJECTIVE OF THE INVENTION

A primary objective of the present invention is to provide a bus with a door opening in the front end thereof, and a forwardly extensible, telescoping front platform, preferably with a drop ramp on at least one side thereof, which lowers to substantially curb height upon extension of the platform. A door for closing the door opening may be mounted on the platform, so that extending the platform opens the door.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
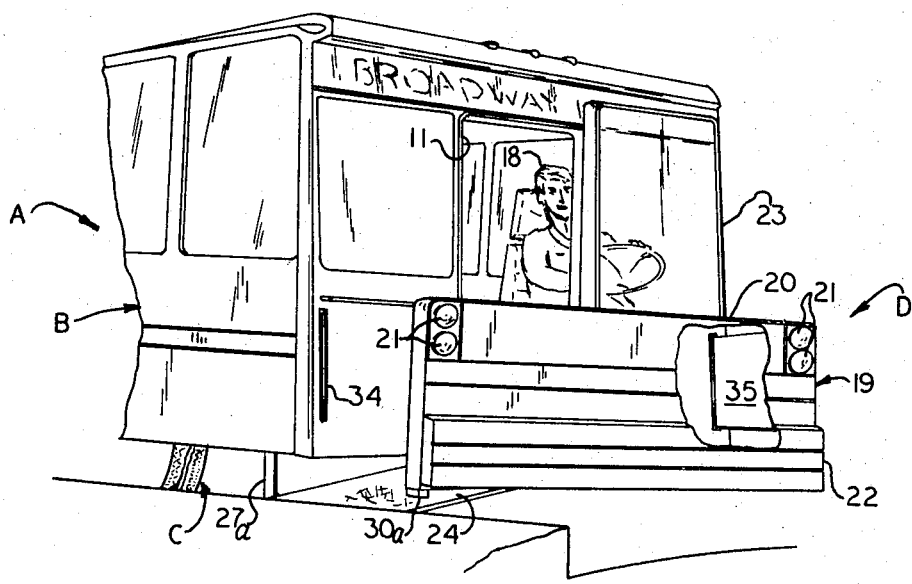
FIG. 1 is a fragmentary, perspective view of the front portion of a bus embodying the invention with the bus stopped at the right hand curb, and the platform extended, ready to discharge or take on passengers.

Referring to the drawings in detail, a bus A may be of a generally conventional type, although the floor 10 of the illustrative bus A is lower than in most buses now in use. The lowered floor structure is a concept which is now under development, and appears to have many advantages over prior types of construction. Regardless of the structure of the bus, however, the present invention can be embodied therein in accordance with well-known practice by a designer or worker of ordinary skill familiar with the art and with knowledge of the present invention as described herein.

The illustrative bus A embodying the invention comprises an otherwise generally conventional type of body B and support wheels C, and a door opening 11 located centrally in the front end of the bus body B. An extensible front platform structure D is mounted on the front end of the bus for controlled movement between extended and retracted position.

Figure 3:
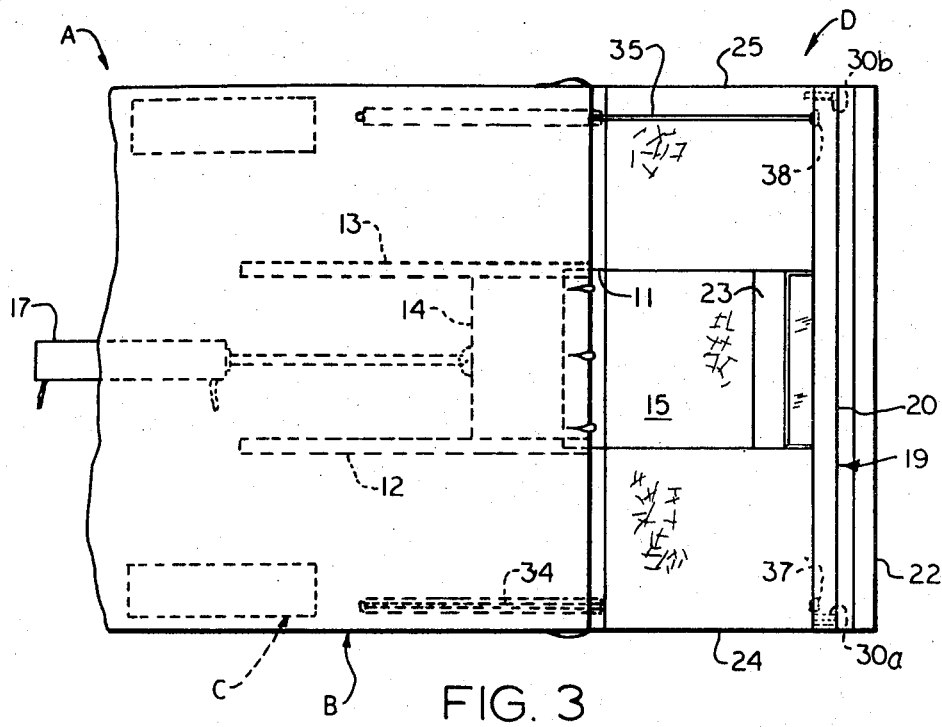
FIG. 3 is a top, plan view of the portion shown in FIG. 1, portions of the platform operating mechanism and the bus front wheels being shown in broken lines.
Figure 4:
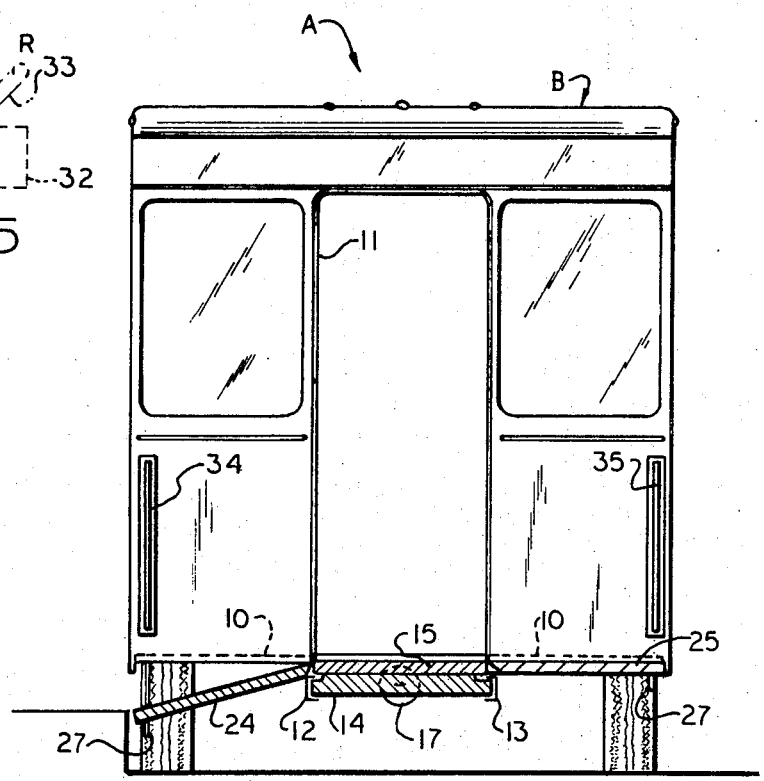
FIG. 4 is a sectional view taken along line 4—4 of FIG. 2.

For mounting the platform structure D on the bus A a pair of channel tracks 12 and 13 are mounted to extend longitudinally beneath the bus floor 10, and a platform support member 14, see FIGS. 3 and 4, is mounted for guided, power driven movement back and forth along said tracks. A central platform portion 15, preferably of a width substantially that of the door opening 11, is mounted on the platform support member 14 for movement therewith and with operating clearance beneath the bus floor 10.

Figure 2:
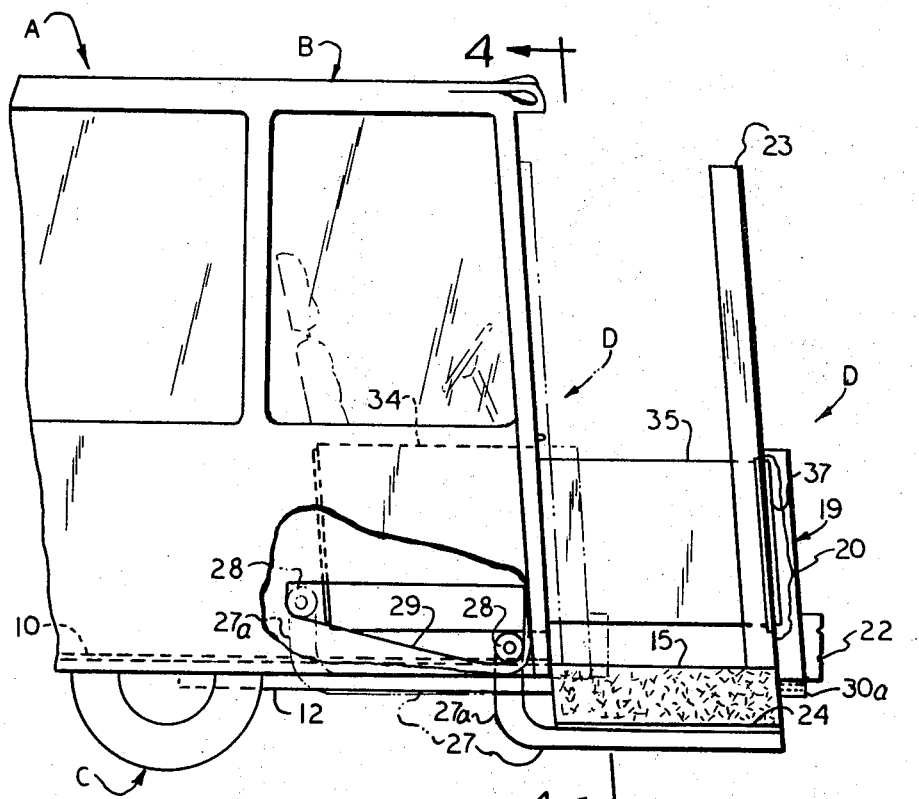
FIG. 2 is a somewhat enlarged, side, elevational view of the portion shown in FIG. 1, the platform being shown extended in solid lines, and retracted in broken lines.

Suitable means for moving the platform support member 14 and its supported mechanism between retracted and extended position comprises an air or hydraulic cylinder 17, powered from the usual supply of compressed air or hydraulic fluid with which buses normally are provided, and may be controlled by conventional type remote control means, not shown, by an operator 18 so as to move the platform structure D selectively between its retracted, broken line position of FIG. 2, and its extended, solid line position of the same figure.

A transversely extending platform front portion 19 comprises a front rail or wall 20, with usual headlights 21 mounted therein, and a protective bumper portion 22 at suitable ehight. This platform front structure is strongly and fixedly mounted on the front end of the platform support member 14 for movement therewith. A door 23 preferably is mounted on the forward platform structure 19, and is of a size, and is positioned, to fit into and seal the door opening 11 when the platform D is retracted to its broken line position of FIG. 2.

A pair of drop ramps 24 and 25 are hingedly connected, one to each side of the platform central portion 15, and are carried by the latter as it is moved between its retracted and extended positions. Each ramp 24 and 25 is of substantially the same fore-and-aft length as the platform central portion 15, and is of a width, transversely of the bus, to extend substantially to the side of the bus.

The outer end of each ramp, such as the ramp 24, is supported by an L-shaped, cam-actuated member 27, see FIGS. 2 and 4, secured by a pivoted connection to its associated ramp. The rear portion 27a of each ramp support member 27 extends upwardly at an angle of 90°, and a cam follower roller 28 is journalled on the upper end thereof. Each foller 28 rolls along an inclined cam 29 mounted one on each side of the bus body B as the platform D, with its ramps 24 and 25, moves between its retracted and extended position, it will be noted that the top of each cam follower roller 28 is unrestricted, so as to allow the roller to rise free of its cam 29 when the platform is extended with the ramp latched in its raised position, or in the event the ramp should seat on a curb before it is fully lowered.

For latching a selected ramp in its raised position, a pair of conventional, remote controlled, normally actuated, ramp support latches 30a and 30b, see FIGS. 2 and 3, are provided, one on a laterally outward portion of each side of the platform front structure 19. In its normal, or actuated, latching position, each of these latches supports the free end of its respective ramp and prevents it from lowering upon extension of the platform. The ramp support latch on a selected side of the bus is moved to releasing positions by the operator moving the control lever 31 of a conventional type remote control mechanism 32, shown diagrammatically in FIG. 5, to selected position, whereby the driver selects the side of the bus from which passengers are to be taken on and discharged. Assuming, for example, that the right hand side of the bus is so selected, the lever 31 is moved to its right hand position 33, indicated by the letter "R" in FIG. 5, in which case the right hand latch 30a released to allow its ramp 24 to lower, and the left hand latch 30b remains in its normal condition thereby latching its associated left hand ramp 25 in raised position.

A pair of passenger restrain gates 34 and 35 also are provided, one for each side of the bus. These gates are conventional, spring biased, normally retracted, sliding construction, and are respectively controlled by conventional, normally released latches 37 and 38, see FIG. 2, of electro-magnetic or other suitable or well known type. One of these latches is provided on the laterally outward portion of each side of the platform front structure 19 in position to engage its respective gate. Movement of the control lever 31 to its right hand position 33 of FIG. 5, in addition to releasing the right hand ramp, support latch 30a, also actuates the left hand gate latch 38 to gate engaging positions. Thus, when the platform D is extended, the right hand ramp 24 is lowered and the left hand gate is extended to its closed position, both as shown in FIGS. 1 and 3. Movement of the control lever 31 to its left hand position of FIG. 5 reverses the actuation of the ramp and gate latches for stopping on the left hand side of the street.

OPERATION

In operating the illustrative mechanism, upon approaching a bus stop located, for example, on the right hand side of the street along which the bus is traveling, before actuating the usual "Door Open" control, not shown, the driver actuates the control mechanism 32 by moving the control lever 31 to its position 33 designated by the letter "R". This withdraws the right hand ramp support latch 30a to allow the right hand ramp to lower, and also left hand gate engaging latch 38 to latch the left hand gate 35 to the forward platform structure 19 for extension therewith as shown in FIG. 2 and 3 described previously herein.

When the bus stops, and the bus driver actuates the usual "Door Open" control, the entire front platform structure D, carrying the front closure door 23 and the left hand gate 35 with it, is moved to its extended position of FIG. 1 by the cylinder 17. As this occurs, the right hand ramp 24 is lowered by its cam 29 to its position shown in solid lines in FIG. 1 unless arrested by resting on a curb or other solid object. The right hand gate 34 remains in its retracted position as shown in FIG. 1 so as to permit the taking on and discharging of passengers via the lowered right hand ramp.

Figure 5:
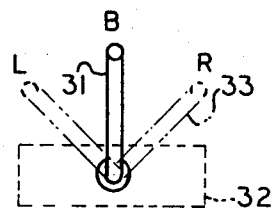
FIG. 5 is a diagrammatic view showing a conventional control box with a lever for selective control of the side ramps and gates when stopping the bus on either selected side of a street.

If desired, the centered, solid line position of the control lever 31 of FIG. 5 may be used to lower both ramps 24 and 25 while leaving retracted both gates 34 and 35. Such an arrangement may be desirable for use in the event of an emergency, or to load or discharge passengers from both sides of the bus at once, as in a parking lot at a sporting event.

The invention provides for full and unobstructed use of the entire interior of the bus, aligns the front door with the center isle of the bus for more efficient control and fare handling by the driver, and provides a very effective front bumper for the bus.

Having thus described my invention, what I claim as new and useful and desire to protect by U. S. Letters Patent is:

1. In a bus having a body with a door opening in the front end thereof, and a door mounted to selectively expose and close such door opening, an extensible platform mounted beneath such door opening for movement lengthwise of the bus body between retracted position substantially flush with the front end of the vehicle, and extended position extending forwardly beyond the front end of the vehicle for supporting passengers boarding and leaving the vehicle through the front door opening, said door is carried by a forward portion of the platform to move forwardly clear of the door opening upon movement of the platform to its extended position, and rearwardly into the door opening to close such opening upon movement of the platform to its retracted position, and power actuated means controlled by an operator of the bus for selectively moving the platform between its retracted and extended positions.

2. In a bus having a body with a door opening in the front end thereof, and a door mounted to selectively expose and close such door opening, an extensible platform mounted beneath such door opening for movement lengthwise of the bus body between retracted position substantially flush with the front end of the vehicle, and extended position extending forwardly beyond the front end of the vehicle for supporting passengers boarding and leaving the vehicle through the front door opening, said platform comprises a platform support member mounted on the track means for controlled forward and rearward movement thereon, a platform portion is fixedly mounted on the platform support member for movement therewith, at least one platform ramp is hingedly connected to a selected side of the fixed platform portion, and means are provided for lowering said at least one platform ramp upon movement of the platform to extended position, and power actuated means controlled by an operator of the bus for selectively moving the platform between its retracted and extended positions.

3. An extensible front bus platform as claimed in claim 2 wherein the means for lowering the ramp comprises a cam mounted lengthwise along a side of the bus body and in operative engagement with the ramp on the same side of the bus body.

4. An extensible front bus platform as claimed in claim 3 wherein a ramp is provided on each side of the fixed platform portion and controlled means are provided to selectively retain each of said ramps against lowering upon movement on the fixed platform portion to its extended position.

5. In a bus having a body with a door opening in the front end thereof, and a door mounted to selectively expose and close such door opening, an extensible platform mounted beneath such door opening for movement lengthwise of the bus body between retracted position substantially flush with the front end of the vehicle, and extended position extending forwardly beyond the front end of the vehicle for supporting passengers boarding and leaving the vehicle through the front door opening, gate means are provided, one for each end of the platform directed toward a side of the bus, and means controlled by an operator of the bus to move a selected one of the gate means to closed condition across its respective end of the platform upon moving the platform to its extended position, thereby to bar passengers from boarding and leaving the platform at such selected end of the platform, and power actuated means controlled by an operator of the bus for selectively moving the platform between its retracted and extended positions.

6. An extensible front bus platform as claimed in claim 5 wherein each of the gates is mounted for sliding movement lengthwise of a side of the bus from a position rearwardly clear of the front end of the bus, to a position extending across an end of the platform with the latter moved to its extended position, and means controlled by an operator of the bus is provided at each end of the bus platform to engage a selected one of the gates and draw it forward with the platform upon movement of the platform to its extended position.

* * * * *